J. W. VAN DYKE.
UNIVERSAL JOINT.
APPLICATION FILED DEC. 14, 1915.
1,183,143.
Patented May 16, 1916.
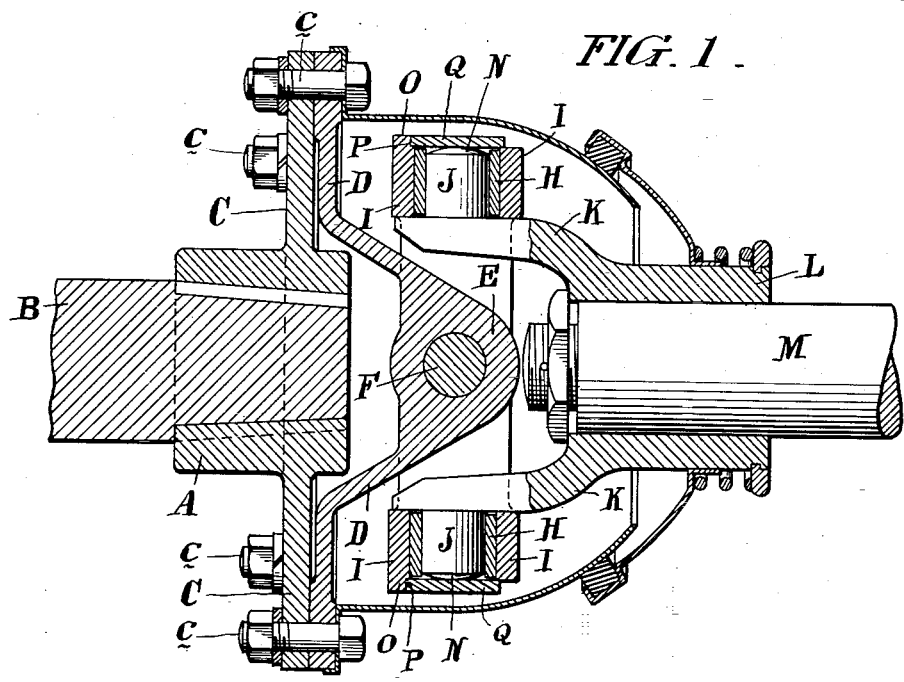
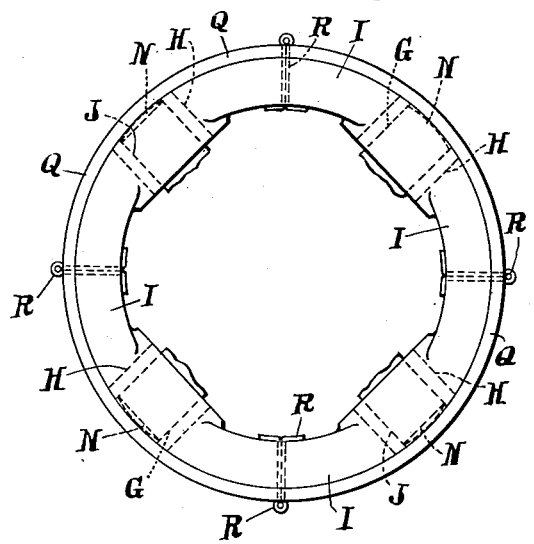 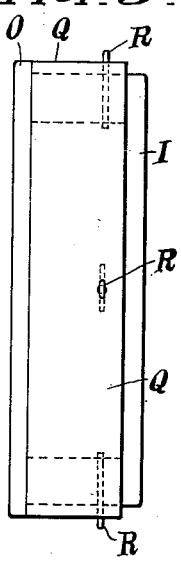 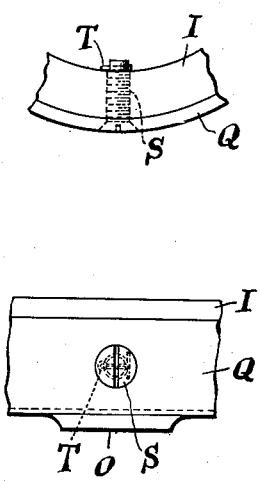
Inventor
John W. Van Dyke
By Cornelius L. Ehret
His Attorney

UNITED STATES PATENT OFFICE.

JOHN W. VAN DYKE, OF PHILADELPHIA, PENNSYLVANIA.

UNIVERSAL JOINT.

1,183,143.

Specification of Letters Patent. Patented May 16, 1916.

Application filed December 14, 1915. Serial No. 66,672.

*To all whom it may concern:*

Be it known that I, JOHN W. VAN DYKE, a citizen of the United States, residing in the city of Philadelphia, county of Philadelphia, and State of Pennsylvania, have invented a new and useful Universal Joint, of which the following is a specification.

My invention relates to a universal joint for transmitting power from a rotating driving shaft to a driven shaft whose axis of rotation is generally disposed at an angle with respect to the axis of rotation of the driving shaft.

My invention resides in a structure of the character hereinafter described comprising a universal joint in which members secured respectively to the driving and driven shafts are connected to an intermediate member by pins bearing in bushings in the intermediate member together with means for preventing escape or displacement of the bushings when subjected to the strains and forces incident to use.

For an illustration of one of the forms my invention may take, reference may be had to the accompanying drawing, in which:

Figure 1 is a sectional view of a universal joint structure embodying my invention. Fig. 2 is a fragmentary side elevational view showing means for confining the bushings and means for locking or securing said means to the member carrying the bushings. Fig. 3 is an end elevational view of the structure shown in Fig. 2. Fig. 4 is a fragmentary view in side elevation illustrating a modified form of means for locking or securing the bushing confining member to the bushing carrying member. Fig. 5 is a plan view of the structure shown in Fig. 4.

The hub A forms a connection for the shaft B to the plate or disk C to which is secured by bolts *c* a bracket or yoke member D having the transversely extending sleeve E in which is disposed the shaft or pin F whose ends form bearing pins G, G, Fig. 2, bearing in bushings H in the intermediate member or ring I. At right angles to the bearing pins G, G are the bearing pins J, J bearing in bushings H in the ring or member I. The pins J are secured upon the yoke K in whose hub L is secured the second shaft M.

The pins G and J have their greatest lengths at their axes, that is to say, from the centers of their outer ends the bearing pins curve or otherwise fall away to their cylindrical surfaces, as indicated at N.

O is a ridge or projection extending either continuously or at suitable intervals circumferentially of the ring I, and is provided with the shoulder P against which lies the ring Q which is passed over the ring I from right to left, as viewed in Fig. 1, to the position shown, in which it lies against the curved ends of the bearing pins G and J, the bushings H being confined beneath the ring Q which prevents the bushings H from working outwardly under the strains and forces incident to the use of the universal joint.

To confine the ring Q in position and prevent working off toward the right, as viewed in Fig. 1, cotter pins R, Figs. 2 and 3, extend through registering holes in the rings I and Q, the cotter pins being locked by bending back their inner ends as shown in Fig. 2. Or as shown in Figs. 4 and 5, the ring Q may be countersunk to receive the head of a screw S which is threaded into the ring I, extending completely therethrough and locked by a cotter pin T.

What I claim is:

1. A universal joint comprising an intermediate member, bearing bushings therein, driving and driven members having bearing pins engaging in said bushings, and a ring extending around said intermediate member and confining said bushings against outward movement.

2. A universal joint comprising an intermediate member, bearing bushings therein, driving and driven members having bearing pins engaging in said bushings, and a ring extending around said intermediate member and confining said bushings against outward movement, said ring contacting with said bearing pins at the raised centers of their outer ends.

3. A universal joint comprising an intermediate member, bearing bushings therein, driving and driven members having bearing pins engaging in said bushings, and a ring extending around said intermediate member and confining said bushings against outward movement, said intermediate member having a shoulder engaged by a lateral edge of said ring.

4. A universal joint comprising an intermediate member, bearing bushings therein, driving and driven members having bearing pins engaging in said bushings, and a ring extending around said intermediate member and confining said bushings against outward movement, said ring contacting with said bearing pins at the raised centers of the outer ends, said intermediate member having a shoulder engaged by a lateral edge of said ring.

5. A universal joint comprising an intermediate member, bearing bushings therein, driving and driven members having bearing pins engaging in said bushings, a ring extending around said intermediate member and confining said bushings against outward movement, and means preventing lateral displacement of said ring.

6. A universal joint comprising an intermediate member, bearing bushings therein, driving and driven members having bearing pins engaging in said bushings, a ring extending around said intermediate member and confining said bushings against outward movement, and means securing said ring to said intermediate member, whereby lateral displacement of said ring is prevented.

7. A universal joint comprising an intermediate ring, bearing bushings therein, driving and driven members having bearing pins engaging in said bushings, and a second ring disposed upon the periphery of said first named ring and preventing outward movement of said bushings.

8. A universal joint comprising an intermediate ring, bearing bushings therein, driving and driven members having bearing pins engaging in said bushings, and a second ring disposed upon the periphery of said first named ring engaging the ends of said bearing pins and preventing outward movement of said bushings.

9. A universal joint comprising an intermediate ring, bearing bushings therein, driving and driven members having bearing pins engaging in said bushings, a second ring disposed upon the periphery of said first named ring engaging the ends of said bearing pins and preventing outward movement of said bushings, and means securing said second ring to said first named ring.

10. A universal joint comprising an intermediate ring, bearing bushings therein, driving and driven members having bearing pins engaging in said bushings, and a second ring disposed upon the periphery of said first named ring and preventing outward movement of said bushings, said first named ring having a shoulder engaged by a lateral edge of said second ring.

11. A universal joint comprising an intermediate ring, bearing bushings therein, driving and driven members having bearing pins engaging in said bushings, a second ring disposed upon the periphery of said first named ring and preventing outward movement of said bushings, said first named ring having a shoulder engaged by a lateral edge of said second ring, and means securing said second ring to said first named ring.

In testimony whereof I have hereunto affixed my signature this 10th day of December, 1915.

JOHN W. VAN DYKE.